(12) United States Patent
Eisenzopf

(10) Patent No.: US 10,929,611 B2
(45) Date of Patent: Feb. 23, 2021

(54) COMPUTER-BASED INTERLOCUTOR UNDERSTANDING USING CLASSIFYING CONVERSATION SEGMENTS

(71) Applicant: discourse.ai, Inc., Dallas, TX (US)

(72) Inventor: Jonathan E. Eisenzopf, Dallas, TX (US)

(73) Assignee: discourse.ai, Inc., Dallas, TX (US)

( * ) Notice: Subject to any disclaimer, the term of this patent is extended or adjusted under 35 U.S.C. 154(b) by 200 days.

(21) Appl. No.: 16/201,188

(22) Filed: Nov. 27, 2018

(65) Prior Publication Data
US 2019/0171712 A1    Jun. 6, 2019

Related U.S. Application Data

(60) Provisional application No. 62/594,610, filed on Dec. 5, 2017.

(51) Int. Cl.
*G06F 40/30* (2020.01)
*G06F 40/35* (2020.01)

(52) U.S. Cl.
CPC .............. *G06F 40/30* (2020.01); *G06F 40/35* (2020.01)

(58) Field of Classification Search
USPC ...................................................... 704/1–504
See application file for complete search history.

(56) References Cited

U.S. PATENT DOCUMENTS

| | | | | |
|---|---|---|---|---|
| 8,346,563 | B1 * | 1/2013 | Hjelm ................. | G10L 15/1822 704/275 |
| 8,706,472 | B2 * | 4/2014 | Ramerth ................. | G06F 40/53 704/2 |
| 8,762,316 | B2 * | 6/2014 | Jerram ............... | G06Q 30/0256 706/46 |
| 9,129,601 | B2 * | 9/2015 | Stent ........................ | G06F 40/12 |
| 9,430,463 | B2 * | 8/2016 | Futrell ................... | G06F 40/194 |
| 9,569,743 | B2 * | 2/2017 | Fehr ........................ | G06N 20/00 |
| 9,575,936 | B2 * | 2/2017 | Romano ............... | G06F 40/109 |
| 9,621,713 | B1 * | 4/2017 | Gainsboro ........ | H04M 3/42221 |

(Continued)

FOREIGN PATENT DOCUMENTS

| WO | 2014069122 A1 | 8/2014 |
|---|---|---|
| WO | 2018067368 A1 | 4/2018 |

OTHER PUBLICATIONS

Machine Translation (partial) of WO2014069122A1 retrieved from http://patents.google.com/patent on Sep. 7, 2018.

(Continued)

*Primary Examiner* — Marcus T Riley

(74) *Attorney, Agent, or Firm* — Robert H. Frantz

(57) ABSTRACT

Computer-based natural language understanding of input and output for a computer interlocutor is improved using a method of classifying conversation segments from transcribed conversations. The improvement includes one or more methods of splitting transcribed conversations into groups related to a conversation ontology using metadata; identifying dominant paths of conversational behavior by counting the frequency of occurrences of the behavior for a given path; creating a conversation model comprising conversation behaviors, metadata, and dominant paths; and using the conversation model to assign a probability score for a matched input to the computer interlocutor or a generated output from the computer interlocutor.

18 Claims, 8 Drawing Sheets

(56) References Cited

U.S. PATENT DOCUMENTS

| | | | | |
|---|---|---|---|---|
| 9,740,677 | B2* | 8/2017 | Kim | G06F 40/20 |
| 9,966,065 | B2* | 5/2018 | Gruber | G10L 15/1822 |
| 10,169,329 | B2* | 1/2019 | Futrell | G06F 40/30 |
| 10,269,345 | B2* | 4/2019 | Castillo Sanchez | G10L 13/08 |
| 10,296,160 | B2* | 5/2019 | Shah | G06F 3/0481 |
| 2007/0071206 | A1* | 3/2007 | Gainsboro | G10L 25/63 |
| | | | | 379/168 |
| 2009/0306981 | A1* | 12/2009 | Cromack | G06F 16/685 |
| | | | | 704/235 |
| 2014/0129418 | A1* | 5/2014 | Jerram | G10L 25/27 |
| | | | | 705/37 |
| 2014/0244249 | A1* | 8/2014 | Mohamed | G10L 25/63 |
| | | | | 704/233 |
| 2015/0142704 | A1* | 5/2015 | London | G06N 5/022 |
| | | | | 706/11 |
| 2015/0161521 | A1* | 6/2015 | Shah | G06F 3/0481 |
| | | | | 706/12 |
| 2015/0222752 | A1* | 8/2015 | Fehr | G06Q 10/0637 |
| | | | | 379/88.01 |
| 2016/0019885 | A1* | 1/2016 | Romano | G06F 40/109 |
| | | | | 704/9 |
| 2018/0143967 | A1* | 5/2018 | Anbazhagan | G06F 40/35 |
| 2019/0171712 | A1* | 6/2019 | Eisenzopf | G06F 40/30 |
| 2020/0143288 | A1* | 5/2020 | Eisenzopf | H04L 51/02 |
| 2020/0175964 | A1* | 6/2020 | Eisenzopf | G06F 16/9024 |

OTHER PUBLICATIONS

Ang, J., et al.; "Automatic Dialog Act Segmentation and Classification in Multiparty Meetings,"; date unknown.

Dunne, J. et al.; "Hello & Goodbye: Conversation Boundary Identification Using Text Classification"; 2018.

Galley, M. et al.; "Discourse Segmentation of Multi-Party Conversation"; date unknown.

Garreta, Raul; How to create text classifiers with Machine Learning, retrieved on Sep. 7, 2018 from https://monkeyleam.com/blog.

Hsueh, P-Y. et al; "Automatic Segmentation of Multiparty Dialogue"; date unknown.

Joty, S. et al.; "Topic Segmentation and Labeling in Asynchronous Conversations"; 2013.

Joty, S. et al.; "Supervised Topic Segmentation of Email Conversations"; 2011.

Michiels, Eric; "Modelling Chatbots with a Cognitive System Allows for a Differentiating User Experience"; 2017.

Olofsson, N. et al.; "A Machine Learning Approach to Dialogue Act Classification in Human-Robot Conversations"; date unknown.

Morchid, M. et al.; "Improving Dialogue Classification using a Topic Space Representation and a Gaussian Classifier Based on the Decision Rule"; date unknown.

Purver, M.; "Topic Segmentation", date unknown.

Ries, K; "Segmenting Conversations by Topic, Initiative and Style"; 2001.

Roth, Ben.; "Topic Extraction and Relation in Instant Messaging"; 2010.

Stewart, Robin S.; "Automatic Identification of Off-Topic Regions of Conversations"; 2006.

Weisz, Justin; "Segmentation and Classification of Online Chats"; date unknown.

Wikipedia; "Dialog act"; retrieved on Sep. 18, 2018 from https://en.wikipedia.org/wiki/Dialog_act.

USPTO; Notice of Allowance on first Office Action, dated Sep. 15, 2020, in related U.S. Appl. No. 16/786,923, filed Feb. 10, 2020. (same examiner as the present Office Action).

* cited by examiner

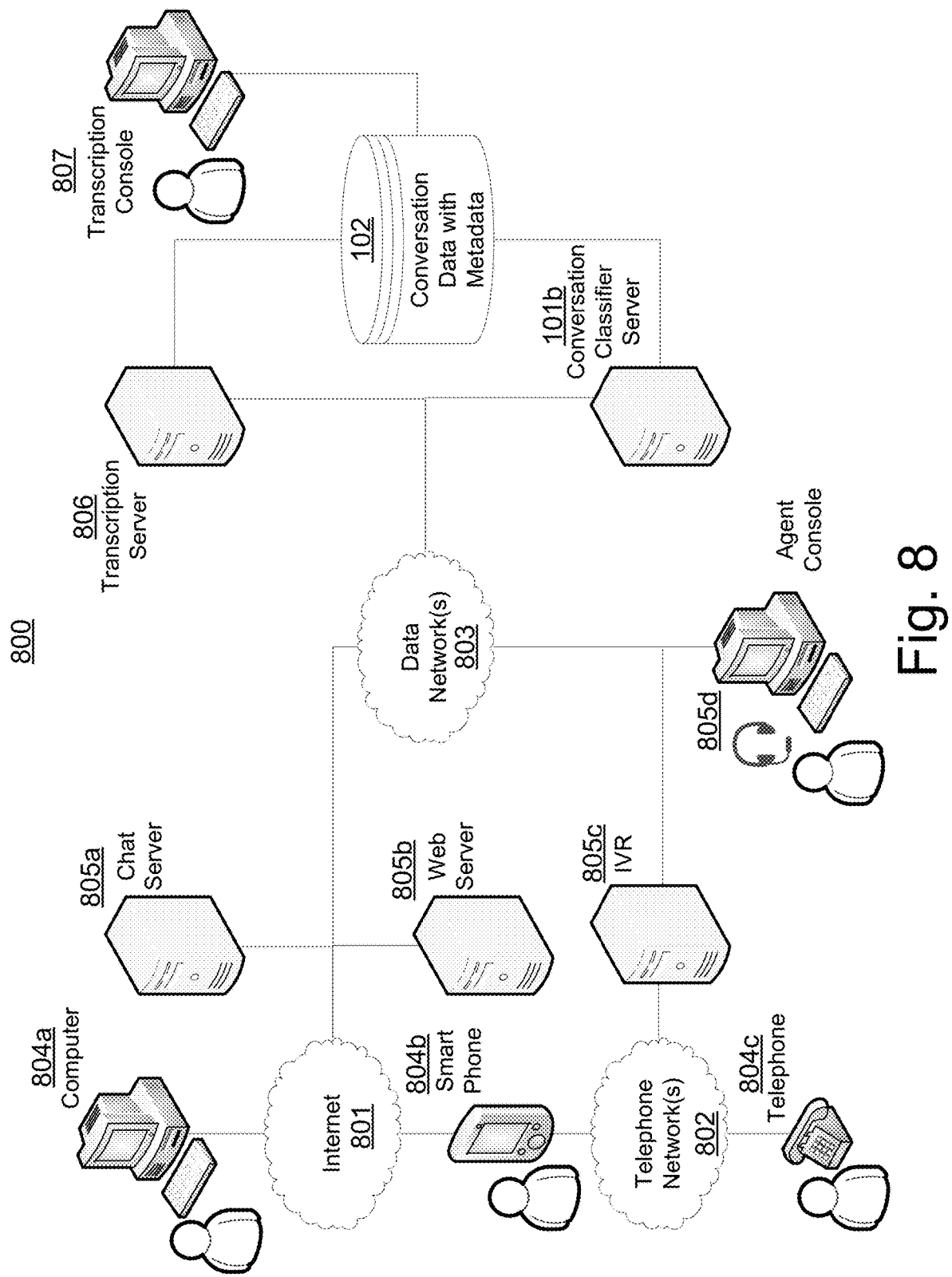

COMPUTER-BASED INTERLOCUTOR UNDERSTANDING USING CLASSIFYING CONVERSATION SEGMENTS

This non-provisional patent application claims benefit of the filing date of U.S. provisional patent application 62/594,610, filed on Dec. 5, 2017, by Jonathan E. Eisenzopf. The present invention relates to certain improvements of computer functionality to understand conversational inputs to an Interactive Voice Response, chat, messaging, or virtual assistant device.

FIELD OF THE INVENTION

Background of Invention

Interactive Voice Response (IVR) systems are commonly used by a wide variety of companies, government agencies, and private organizations to allow users of a telephone to navigate a hierarchy of menus to obtain information, conduct transactions, and connect to human agents for further help. These systems, however, do not offer a natural, conversational interface, but rather require the user to conform to the menu structure provided by the IVR system, which leads to frustration, errors, delays, and loss of customer affinity for the service, company, agency or organization.

Computer-based "chat" systems, messaging applications, and virtual assistants such as Amazon™ Alexa™ and Google Assistant™ allow for unstructured natural language input, but this input format is fundamentally incompatible with the input format of existing IVR systems.

SUMMARY OF THE EXEMPLARY EMBODIMENTS OF THE INVENTION

Computer-based natural language understanding of input and output for a computer interlocutor is improved using a method of classifying conversation segments from transcribed conversations. The improvement includes one or more methods of splitting transcribed conversations into groups related to a conversation ontology using metadata; identifying dominant paths of conversational behavior by counting the frequency of occurrences of the behavior for a given path; creating a conversation model comprising conversation behaviors, metadata, and dominant paths; and using the conversation model to assign a probability score for a matched input to the computer interlocutor or a generated output from the computer interlocutor.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

FIG. 8 illustrates an exemplary arrangement of computers, devices, and networks according to at least one embodiment of the present invention.

DETAILED DESCRIPTION OF ONE OR MORE EXEMPLARY EMBODIMENT(S) OF THE INVENTION

Figure 1:
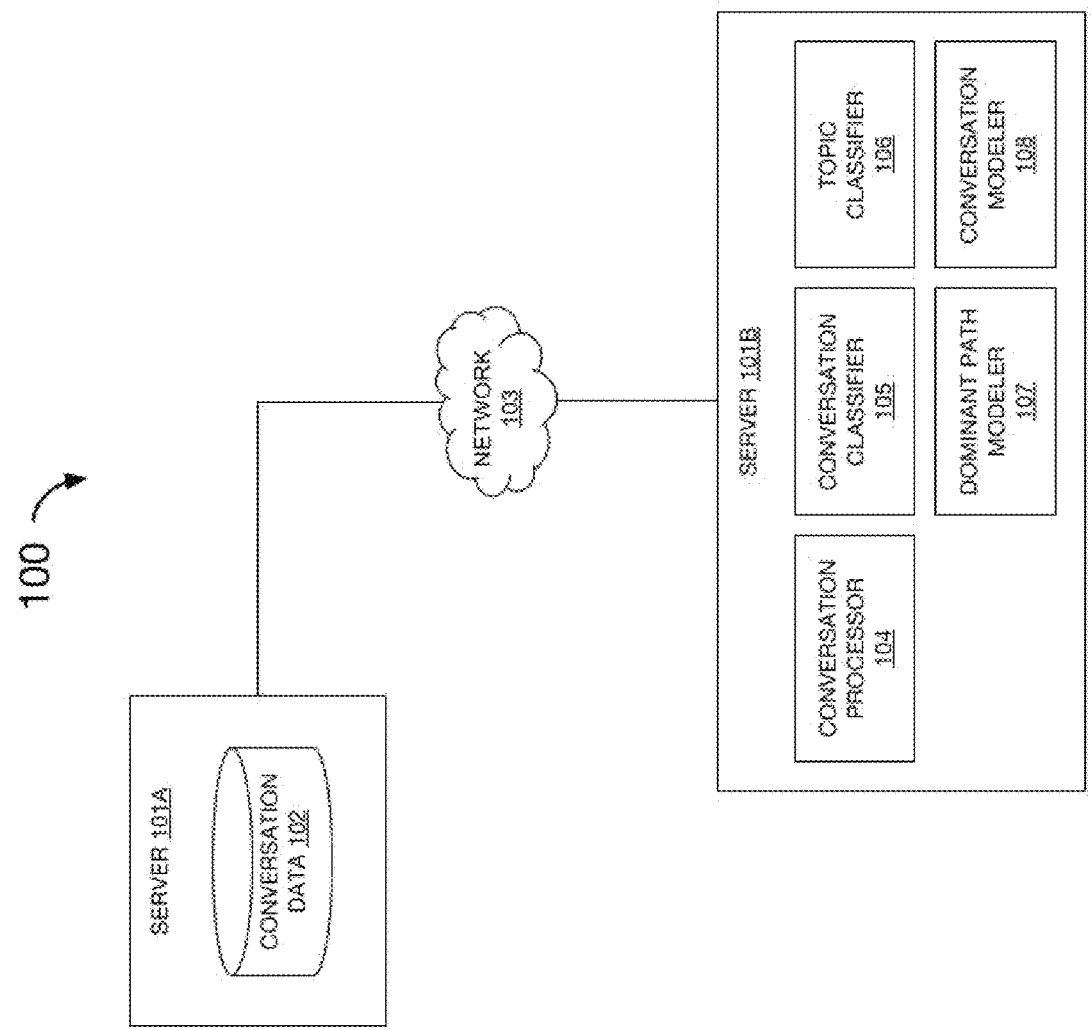
FIG. 1 depicts an improved data processing system and its related components according to at least one embodiment of the present invention.

The present inventor has realized that there is an unmet need in the art of computing and user interface to enable an IVR to interface to a user through a conversational interface, especially through a digital virtual assistant. Certain improvements are disclosed herein that improve the ease of use of an IVR-provided service through particular user interface enhancements, while simultaneously improving the utilization of computer usage of computing resources such as memory footprint, processing bandwidth, and communications bandwidth to yield higher levels of simultaneously-served users by a single computing platform, thereby reducing the cost of the service to the operator.

This invention relates to a data processing system that processes audio, text and/or visual input for a computer interlocutor by creating and using a computer-based and computer-maintained conversation model comprising a plurality of topics comprising a plurality of probable inputs and outputs of a conversation based on a plurality of recorded conversations between a plurality of interlocutors.

The computer interlocutor resides on a computer with attached storage and memory that contains one or more processing units. The computer interlocutor creates responses displayed via an output mechanism such as a an attached computer monitor or embedded visual screen or audio speaker attached to or embedded in the computer or computing device based on matching user inputs from an input device such as a connected keyboard or microphone attached to a computer or computing device.

Computer-based natural language understanding of input and output for a computer interlocutor is improved using a method, disclosed herein, of classifying conversation segments, which includes one or more of the following computer-performed actions, steps or processes:

a. receiving conversation data from transcribed conversations, such as between two people, an online chat or a text messaging system, a speech recognition system, or a chatbot or voicebot system;

b. splitting transcribed conversations into groups related to a conversation ontology using metadata; identifying dominant paths of conversational behavior by counting the frequency of occurrences of the behavior for a given path;

c. creating a conversation model comprising conversation behaviors, metadata, and dominant paths;

d. using the conversation model to assign a probability score for a matched input to the computer interlocutor or a generated output from the computer interlocutor.

e. receiving a plurality of transcribed conversations comprising a plurality of topics comprising a plurality of inputs and outputs by the interlocutors;
f. accessing and using for rule-based decision making a plurality of metadata related to a plurality of conversations, topics, interlocutors, or related computer systems;
g. receiving conversation data from transcribed conversations between one or more of people, an online chat or a text messaging system, a speech recognition system, and a chatbot or voicebot system (in some embodiments, some users' paths may be given more weight than other users);
h. splitting a plurality of transcribed conversations into a plurality of groups related to a conversation ontology using a plurality of metadata;
i. identifying a plurality of dominant paths comprising a plurality of conversational behavior by counting the frequency of occurrences of said behavior for a given path;
j. creating a conversation model comprising plurality of conversation behaviors, metadata, and dominant paths; and
k. accessing and using for rule-based decision making the conversation model to assign a probability score for a matched input to the computer interlocutor or a generated output from the computer interlocutor.

Referring now to FIG. 1, an exemplary improved networked computer environment 100 is depicted according to the present invention. The conversation classifier server 101B is connected to a network 103 and configured such that is it capable of storing and running one or more of the following: a conversation processor 104, a conversation classifier 105, a topic classifier 106, a dominant path modeler 107, and a conversation modeler 108, each of which may be realized by a processor running computer instructions, specialized electronic hardware circuits, or a combination of both. In this exemplary embodiment, another computer 101A is also connected to the computer communications network 103 and contains conversation data 102, which consists of transcribed conversations between two or more human and/or computer interlocutors. In some embodiments, at least one of the interlocutors may be interfaced via an application programming interface (API). In some embodiments, all of the interlocutors may be conducting a dialog within one computer.

Figure 2:
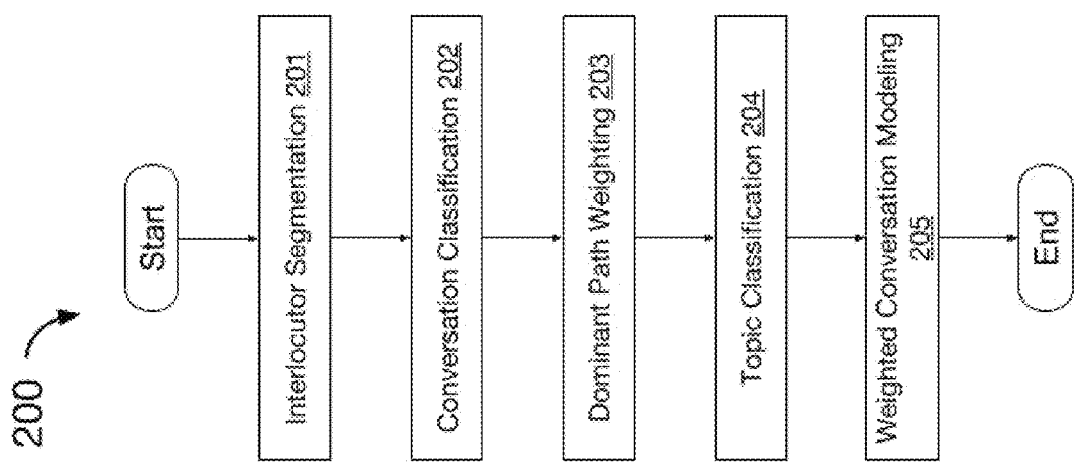
FIG. 2 depicts one or more methods according to the present invention performed by the improved data processing system to classify a plurality of conversation transcriptions between two or more interlocutors.

Referring now to FIG. 2, exemplary methods used by the data processing system 100 to classify a plurality of conversation transcriptions from conversation data 102 between two or more interlocutors 200 are set forth further reference the exemplary arrangement of computing systems as shown in FIG. 1. The first step of the process is to segment the conversation transcript into turns further categorized by interlocutor 201 which is performed, for example, by the conversation processor 104 and further illustrated in FIG. 3. The conversation is further classified 202 according to a conversation ontology 700 according to conversation class 304. In at least one embodiment, the segmenting of a conversation transcript may be performed manually, according to the conversation ontology described herein, or may be performed at least if not entirely automatically using available third-party dialog act processing systems with suitable control parameters.

Next, conversations are weighted 203 according to the number of path traversals, which is performed, for example, by the dominant path modeler 107. Following the previous step, the data processing system performs topic classification 204 using the topic classifier 106. Topic classification can be performed automatically (unsupervised) using techniques such as keyword analysis thesauri, and natural language processing. Finally, the improved data processing system creates 205 a weighted conversation model 600 as further illustrated by FIG. 6 which can be used by a plurality of computer interlocutor systems to improve input and output performance in a number of ways, including but not limited to:

(a) allowing for predictive responses by automated systems in order to handle transactions faster, thereby reducing the computer resources consumed by aggregate transactions and allowing more transactions to by handled by the same amount of hardware;

(b) supporting optimized product design and upgrades by identifying and automating the most likely conversation behaviors to target in resource reduction (decrease response time, reduce memory footprint, reduce processor burden, reduce communications bandwidth, etc.); and (c) increasing customer affinity for interacting with automated systems by reducing delays between conversation turns which are otherwise unnatural delays when two humans are conversing.

Figure 3:
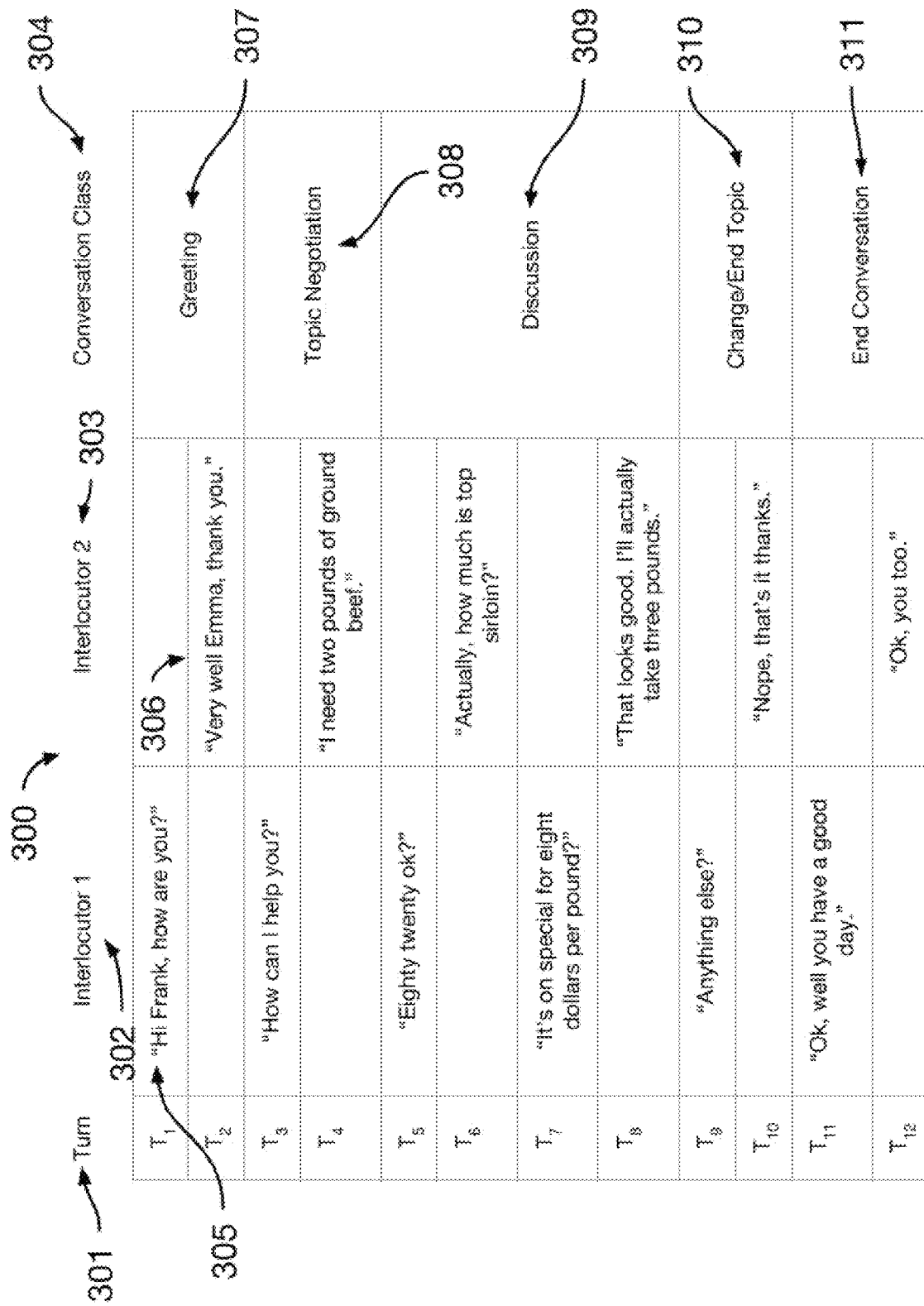
FIG. 3 illustrates an exemplary conversation classification method including splitting a plurality of transcribed conversations between multiple interlocutors into a plurality of conversation segments.

FIG. 3 illustrates an exemplary embodiment 300 of a method for a dominant path weighting 203 and output of the conversation classifier 105. This example includes a series of conversation turns $T_1$-$T_{12}$ 301 by an interlocutor 302 and another interlocutor 303 and further classified into a conversation classes 304 which correspond to a conversation ontology 700 as further illustrated in FIG. 7.

The conversation classifier 105 works by examining the text from the interlocutor 305 comprising a turn 301 and further examines the second interlocutor's text 306, which, together and with processing of subsequent text including the turns of the interlocutors, classifies the turns into a conversation class 304. Illustrative of this figure, the conversation classes are greeting 307, topic negotiation 308, discussion 309, change/end topic 310, and end conversation 311.

Figure 4:
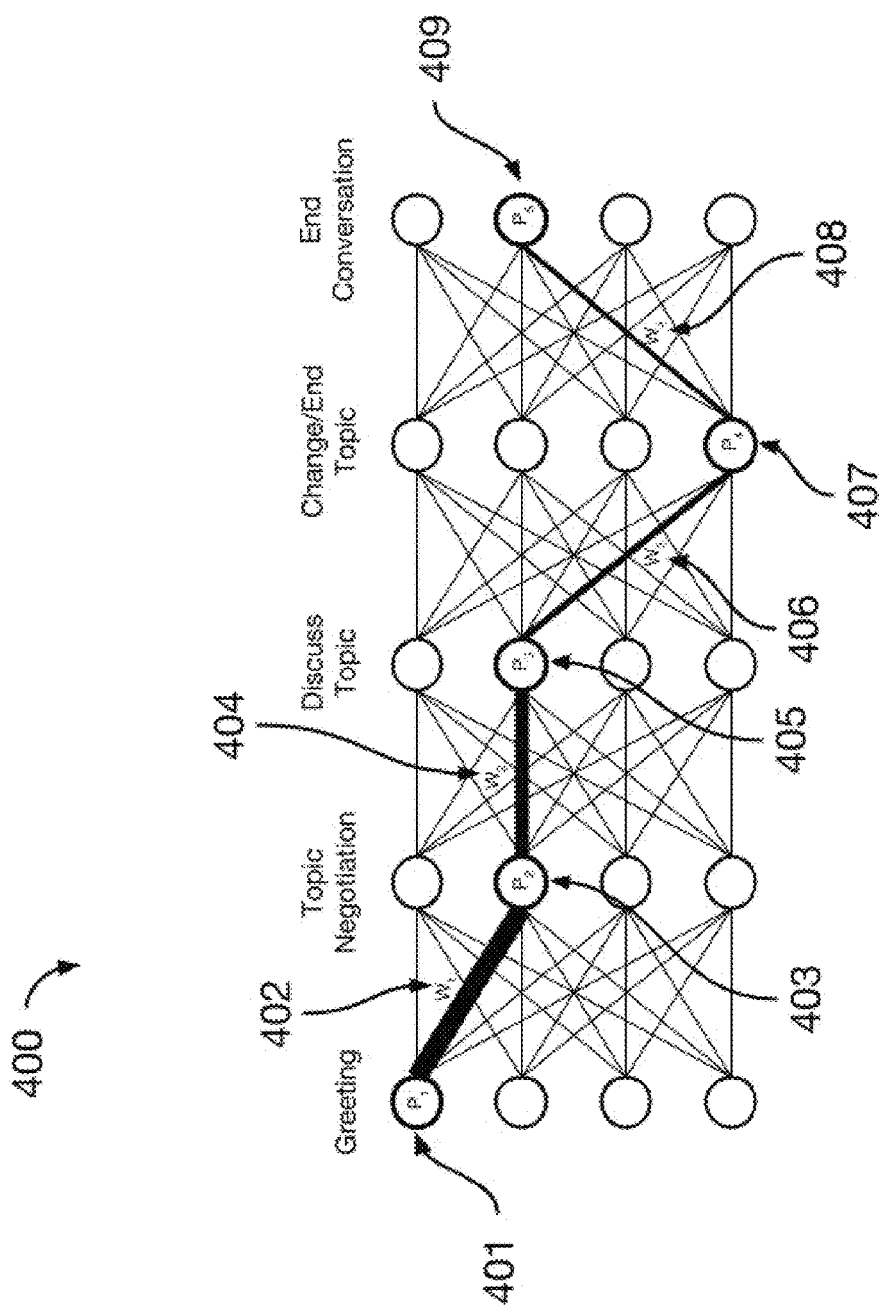
FIG. 4 shows an exemplary embodiment of a method for dominant weighting for a dominant path modeler.

FIG. 4 shows, using a Sankey-like diagram, an exemplary 400 dominant weighting method 203 used, for example, by the dominant path modeler 107 of data processing system 100 based on a plurality of segmented transcribed conversations processed by, for example, the conversation classifier 105 as depicted in FIG. 3. FIG. 4 further illustrates a highlighted dominant path example as produced by the dominant weighting method 203 comprised of a plurality of classified conversations 300. The dominant path model 400 is created, for example, by the dominant path modeler 107. Each step in the dominant path may be representative of a conversation class (304), an interlocutor input, or additional metadata identified by the dominant path modeler. FIG. 4 illustrates a dominant path model and may include a greeting 401, a topic negotiation 403, a topic discussion 405, a change or end of topic 407, and an end of conversation 409 steps (path nodes). The illustrated lines between each element of the dominant path represent the sum of plurality of conversations that traverse each path. The lines or weights (402, 404, 406, and 408) between steps in the paths represent the sums $W_1$-$W_N$ of traversals between steps in the dominant path.

Figure 5:
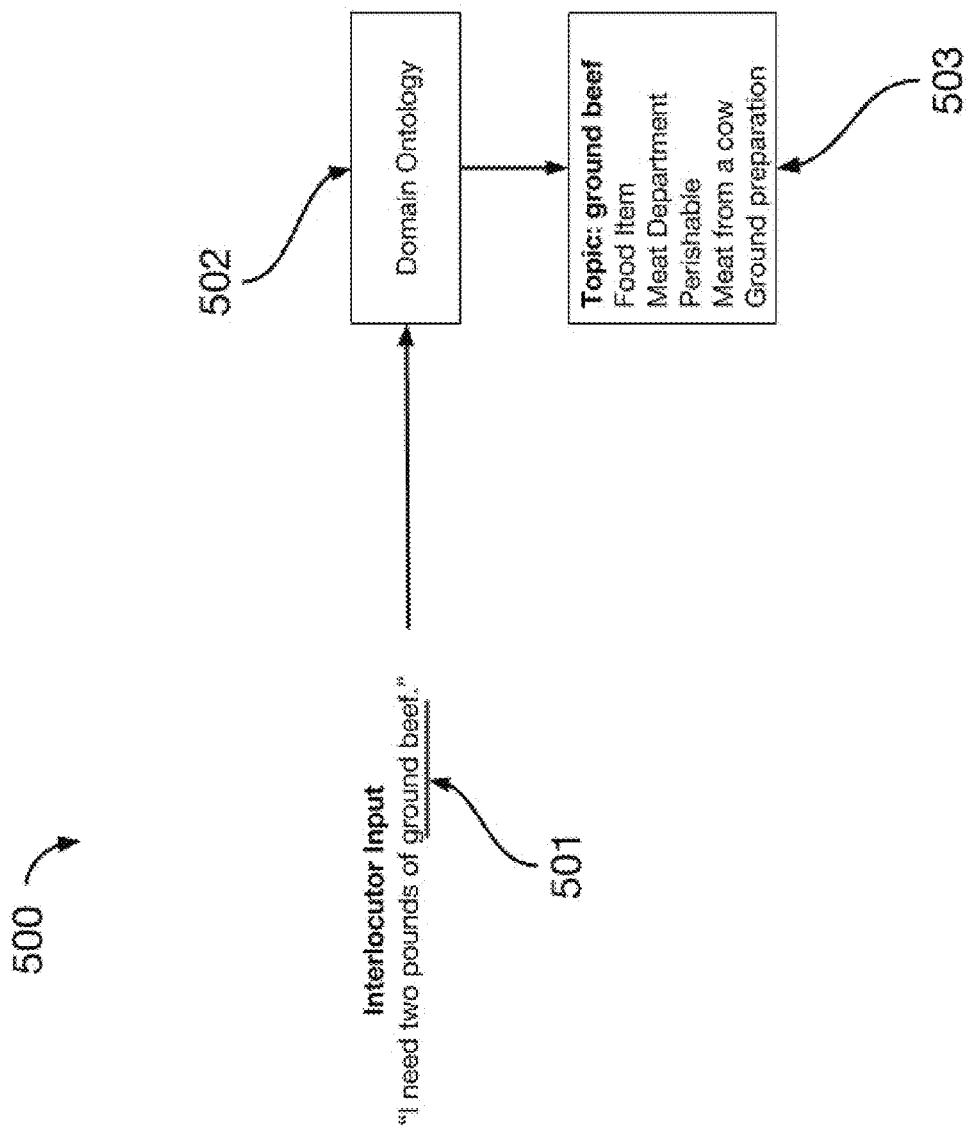
FIG. 5 illustrates an exemplary topic classification method used by a topic classifier to identify the correct topic of conversation.

FIG. 5 depicts 500 an exemplary topic classification method 204 used, for example, by the topic classifier 106 of data processing system 100, and is used to identify the correct topic of conversation based on a plurality of segmented conversations 300 including a plurality of topic negotiation segments 308. FIG. 5 further includes matching interlocutor inputs 501 to a plurality of topics in a plurality of domain ontologies 502 which returns the resulting metadata associated with a plurality of matching topics 503 to, for example, the topic classifier 106.

Figure 6:
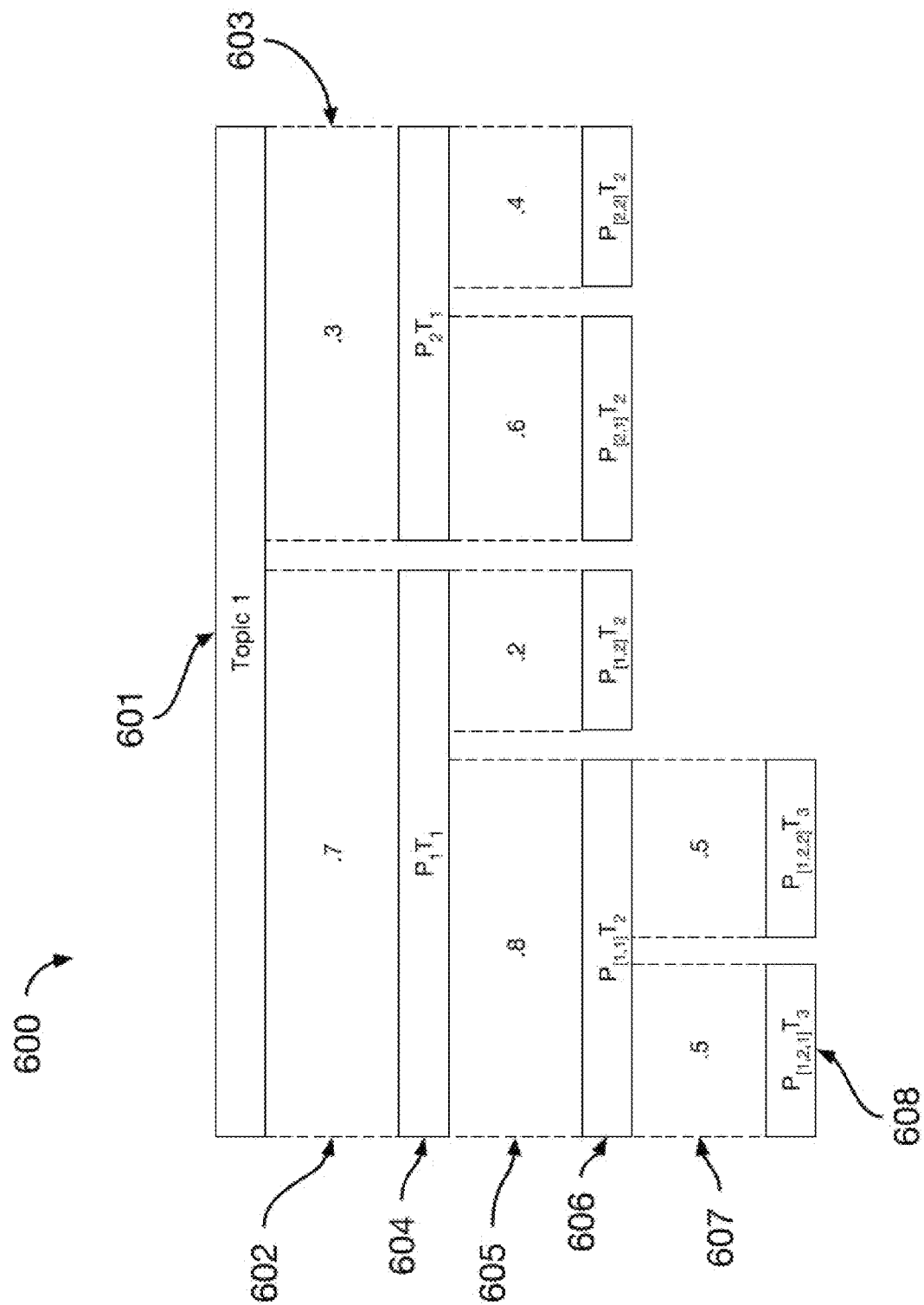
FIG. 6 depicts an exemplary weighted conversation model using a weighted conversation model.

FIG. 6 depicts an exemplary weighted conversation model 600 which is recorded in computer memory in an improved data structure and produced, for example, by the conversation modeler 108 of the data processing system 100, using, for example, the weighted conversation modeling method 205 from a plurality of transcribed conversations for a plurality of identified topics 500. FIG. 6 is illustrative of the weighted conversation modeling method 205 which is produced by the conversation modeler 108 and includes a topic 601 and a plurality of weights 602, 603, 605, 607 associated with a plurality of conversation paths and turns 604, 606, 608. The present method uses the output of, for example, the dominant path modeler 107 and its associated dominant path weighting method 203 and as previously illustrated in FIG. 4 as input.

Each path segment $P_1$-$P_N$ between turns $T_1$-$T_N$ from a given dominant path model 400 and its associated weights $W_1$-$W_N$ are converted to a corresponding weight in the conversation model 600 such that the percentage of conversation traversals are represented as a percentage of the total traversals from the plurality of processed conversations.

For this present illustration, given a topic 601, weight 602 represents the percentage of processed conversations that have traversed the path $P_x$ for the interlocutor turn $T_y$. Further, weight 603 represents a second dominant path weighting with its associated path and interlocutor turn. Further weights for turns by the interlocutors are similarly represented by 605, 606, 607, and 608 as prescribed by the conversation segments, paths and weights contained in the dominant path model 400. The resulting conversation model as illustrated by FIG. 6 and its associated weights can then be used as by a method to predict the next most likely step in a conversation based upon the current position in the conversation model.

Figure 7:
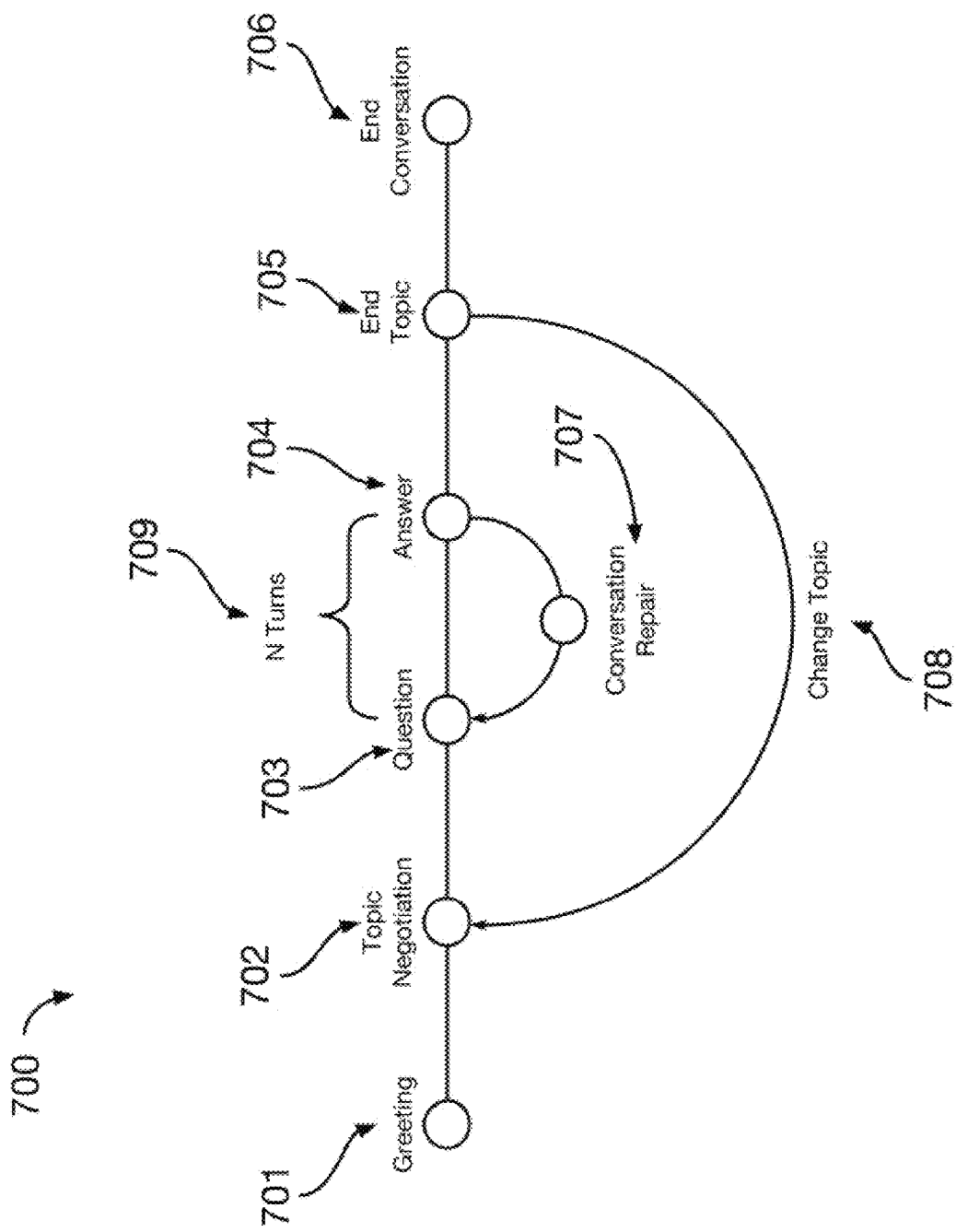
FIG. 7 sets forth an exemplary conversation ontology used to for rule-based decision making to split transcribed conversations into segments for classification by the improved data processing system.

Referring now to FIG. 7, an exemplary conversation ontology is shown using a steam pipe-like diagram, which may consist of entities including a greeting 701, topic negotiation 702, a discussion about a topic comprised of a series of turns 709 between the interlocutors that may contain a corresponding question 703 and answer followed by an end 705 or change of topic 708 followed by an end of conversation 706. Conversation repair 707 occurs within a topic when one or both interlocutors exchange turns during which the initial or earlier topic is finetuned or further refined, but not entirely changed from one domain to another. A plurality of conversation ontologies may be used by the data processing system 100 and one or more of the corresponding methods 200 of the system. Further, an ontology 700 is specifically utilized by the conversation classifier 105 and the associated method conversation classification 203 and as further illustrated by FIG. 3 to segment a plurality of conversations into conversation classes 304.

Referring now to FIG. 8, an exemplary arrangement 800 of computers, devices, and networks according to at least one embodiment of the present invention is shown. A variety, but not exhaustive collection, of interlocutor types are shown, including a computer 804*a*, such as a personal computer or tablet computer, a smart cellular telephone 804*b*, a traditional telephone 804*c*, a chat server 805*a*, a web server 805*b*, an interactive voice response (IVR) system 805*c*, and an agent console 805*d*, which are interconnected via one or more wired or wireless telephone networks 801, data networks 803, and an internet 801. Two more or more of the interlocutor devices can carry on a dialog or conversation, which can be processed according to the forgoing descriptions. This analysis, as described, yields conversation data with metadata 102, which is created via supervised conversation analysis 807, automated conversation analysis 806, or a combination of both. The conversation classifier server 101*b* then communicates via appropriate data networks to access the conversation data 102 and perform the forgoing dominant path analysis.

The preceding example logical processes may include computer processing hardware to embody systems according to the present invention; may be coupled with tangible, computer readable memory devices to realize computer program products according to the invention; and may be embodied as a machine logic method.

The present invention may be realized for many different processors used in many different computing platforms, including but not limited to "Personal Computers" and web servers, running a popular operating systems such as Microsoft™ Windows™ or IBM™ AIX™, UNIX, LINUX, Google Android™, Apple iOS™, and others, to execute one or more application programs to accomplish the computerized methods described herein, thereby providing the improvement to the computer platform as set forth herein.

The "hardware" portion of a computing platform typically includes one or more processors accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces may be provided, as well as specialty interfaces for specific applications. If the computing platform is intended to interact with human users, it is provided with one or more user interface devices, such as display(s), keyboards, pointing devices, speakers, etc. And, each computing platform requires one or more power supplies (battery, AC mains, solar, etc.).

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Certain embodiments utilizing a microprocessor executing a logical process may also be realized through customized electronic circuitry performing the same logical process(es). The foregoing example embodiments do not define the extent or scope of the present invention, but instead are provided as illustrations of how to make and use at least one embodiment of the invention.

What is claimed is:

1. A computer-based method to create one or more digital models of interlocutory conversations comprising:
   receiving, by a computer processor, conversation text data containing one or more transcribed interlocutory conversations between two or more interlocutor devices;
   splitting, by a computer processor, the conversation text data into groups related to at least one conversation ontology using metadata associated with the conversation text data;
   identifying, by a computer processor, one or more dominant paths of conversational behavior between the groups according to the metadata; and
   creating, by a computer processor, a digital conversation model in a computer-readable memory device containing the conversation behaviors, the metadata, and the identified one or more dominant paths, wherein the computer-readable memory device is not a propagating signal per se;
   wherein the splitting comprises, at least in part:
      providing, by a computer processor, the conversation text data to an unsupervised conversation processing server; and
      receiving, by a computer processor, the groups from the unsupervised conversation processing server.

2. The method of claim 1 wherein the at least one conversation ontology defines the groups comprising at least a greeting group, a topic negotiation group, a topic discussion group, a change/end of topic group, and an end-of-conversation group.

3. The method of claim 2 wherein the groups further comprise a topic repair group.

4. The method of claim 1 wherein each group comprises one or more conversational turns, wherein each conversational turn is associated with an interlocutor device.

5. The method of claim 1 wherein the creating a digital conversation model further comprises:
   creating, by a computer processor, a data structure stored in a computer-readable memory device which is not a propagating signal per se;
   creating, by a computer processor, in the data structure, at least one top-level topic record, wherein the at least one top-level topic record comprises a plurality of weight values for conversational paths arriving to the topic from at least two previous groups;
   wherein the weight values represent historical conversational behaviors leading to the topic and are predictive of future conversational behaviors about the same topic.

6. The method of claim 1 wherein the creating a digital conversation model further comprises:
   creating, by a computer processor, a data structure stored in a computer-readable memory device which is not a propagating signal per se;
   creating, by a computer processor, in the data structure, at least one top-level topic record, wherein the top level topic record comprises a plurality of weight values for conversational paths departing from a topic to at least two next groups;
   wherein the plurality of weight values represent historical conversational behaviors leading away from the topic and are predictive of future conversational behaviors about the same topic.

7. The method as set forth in claim 1 wherein the metadata comprises marks associated with conversational turns which indicate a conversational group to which each conversational turn belongs.

8. The method as set forth in claim 1 wherein the metadata comprises one or counts, frequencies, statistics, or a combination of counts, frequencies and statistics, associated with each group, each topic, and each conversational path between groups in the conversational text data.

9. The method of claim 8 wherein one or more dominant paths of conversational behavior are indicated by counts, frequencies or statistics which exceed a threshold, wherein the one or more dominant paths are paths of conversation which are most expected to lead to or depart from a particular group.

10. The method of claim 1 wherein the received conversational text data comprises transcriptions from one or more sources consisting of an online chat or a text messaging system, a speech recognition system, a chatbot and a voicebot system.

11. The method of claim 1 wherein the splitting comprises, at least in part: providing, by a computer processor, the conversation text data to a human interface device; and receiving, by a computer processor, the groups from the human interface device.

12. The method as set forth in claim 1 wherein the conversation text data comprises a plurality of conversations, wherein at least one common interlocutor is included in all the plurality of conversations.

13. The method as set forth in claim 1 wherein the conversation text data comprises a plurality of conversations, wherein more than two different interlocutors are included within the plurality of conversations.

14. The method as set forth in claim 1 wherein the conversation text data comprises turns from at least one automated interlocutor.

15. A computer program product to create one or more digital models of interlocutory conversations comprising:
   a tangible, computer-readable memory device which is not a propagating signal per se; and
   program instructions encoded by the tangible, computer-readable memory device which, when executed by a processor, perform:
      receiving conversation text data containing one or more transcribed interlocutory conversations between two or more interlocutor devices;
      splitting the conversation text data into groups related to at least one conversation ontology using metadata associated with the conversation text data;
      identifying one or more dominant paths of conversational behavior between the groups according to the metadata; and
      creating a digital conversation model in computer memory containing the conversation behaviors, the metadata, and the identified dominant paths;
      wherein the splitting comprises, at least in part:
         providing the conversation text data to an unsupervised conversation processing server; and
         receiving the groups from the unsupervised conversation processor.

16. The computer program product of claim 15 wherein the conversation ontology defines the groups comprising at least a greeting group, a topic negotiation group, a topic discussion group, a change/end of topic group, and an end-of-conversation group, and wherein each group comprises one or more conversational turns, wherein each turn is associated with an interlocutor device.

17. A system to create one or more digital models of interlocutory conversations
comprising:
a computer processor;
a tangible, computer-readable memory device which is not a propagating signal per se; and
program instructions encoded by the tangible, computer-readable memory device which, when executed by the computer processor, perform:
receiving conversation text data containing one or more transcribed interlocutory conversations between two or more interlocutor devices;
splitting the conversation text data into groups related to at least one conversation ontology using metadata associated with the conversation text data;
identifying one or more dominant paths of conversational behavior between the groups according to the metadata; and
creating a digital conversation model in computer memory containing the conversation behaviors, the metadata, and the identified dominant paths;
wherein the splitting comprises, at least in part:
providing the conversation text data to an unsupervised conversation processing server; and
receiving the groups from the unsupervised conversation processor.

18. The system of claim 17 wherein the conversation ontology defines the groups comprising at least a greeting group, a topic negotiation group, a topic discussion group, a change/end of topic group, and an end-of-conversation group, wherein each group comprises one or more conversational turns, wherein each turn is associated with an interlocutor device.

* * * * *